May 2, 1967  C. N. WINNINGSTAD  3,317,830
RESPONSE NORMALIZER DELAY LINE INPUT FOR DIRECT SAMPLING PROBE
Filed March 20, 1963
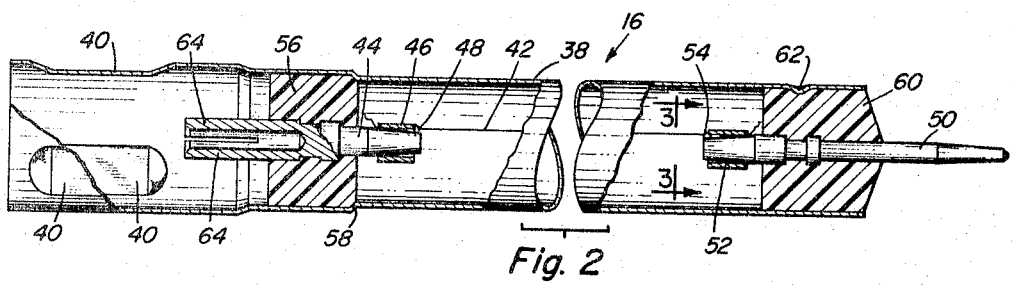
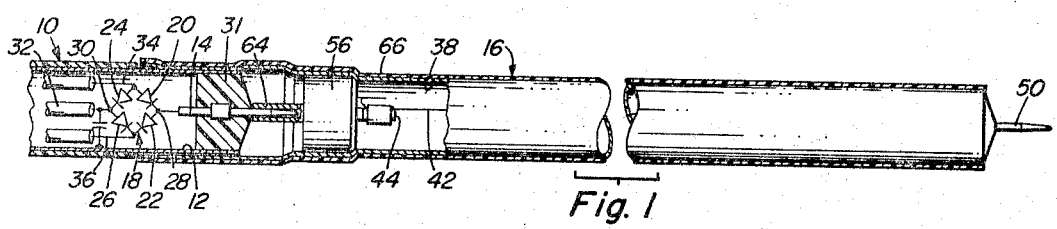
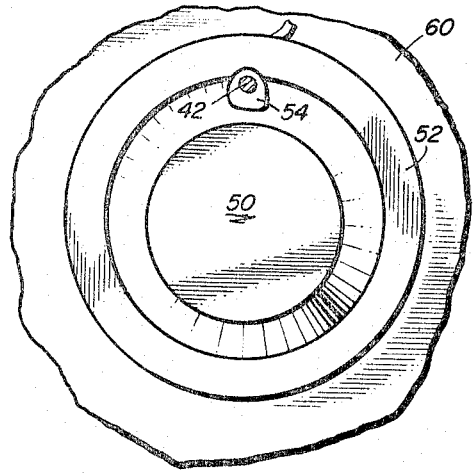
CHESTER N. WINNINGSTAD
INVENTOR.
BY
BUCKHORN, BLORE, KLARQUIST & SPARKMAN
ATTORNEYS

United States Patent Office 3,317,830
Patented May 2, 1967

3,317,830
RESPONSE NORMALIZER DELAY LINE INPUT FOR DIRECT SAMPLING PROBE
Chester N. Winningstad, Portland, Oreg., assignor to Tektronix, Inc., Beaverton, Oreg., a corporation of Oregon
Filed Mar. 20, 1963, Ser. No. 266,689
5 Claims. (Cl. 324—72.5)

The subject matter of the present invention relates generally to electrical probes and in particular to a response normalizer for direct sampling probes which contain a sampling gate within the probe to transmit a sample pulse corresponding to a portion of a repetitive high frequency input signal through such sampling gate to a remote memory circuit connected to the output of such probe. Successive sample pulses corresponding to different portions of the input signal are stored in the memory circuit so that the low frequency output signal of such memory circuit has a wave form which closely resembles that of such input signal. The response normalizer of the present invention is attached to the input of the direct sampling probe and is in the form of a short section of transmission line whose inner conductor is connected at its output end to the input terminal of the sampling gate. The response normalizer effectively prevents distortion of the sample pulse by transient signals produced when such sampling gate is rendered conducting and maintains substantially constant sampling efficiency.

The response normalizer of the present invention is especially useful when employed with a direct sampling probe connected to the vertical signal input of a cathode ray oscilloscope for the reproduction of a high frequency input signal as a low frequency display signal of the fluorescent screen of such oscilloscope. It has been found desirable under some conditions to position the sampling gate within the probe rather than within the oscilloscope to sample the input signal directly in order to prevent attenuation of the input signal. When the sampling gate is within the oscilloscope, terminated low impedance transmission lines are used to connect from the signal source to the sampling gate in order to preserve the high frequency input signal. If it is necessary to reduce the loading on the signal source by the terminated transmission lines, it has been found that isolating probes are necessary which cause undesirable attenuation of such input signal.

The voltage of the sample pulse transmitted to the output terminal of the sampling gate is not equal to the difference between the input signal voltage applied to the input of the gate and the D.C. reference voltage applied to the output of such gate, but is reduced by the sampling efficiency of the gate which may be as low as 2%. In previous direct sampling probes the impedance of the source of the signals affects the sampling efficiency of the sampling gate in such probe so that high impedance sources result in a lower sampling efficiency than low impedance source. It has therefore been necessary to adjust the gain of the circuit of the sampling oscilloscope when testing signal source circuits having different impedances in order to compensate for charges in sampling efficiency of the gate. The present response normalizer effectively isolates the sampling gate from the signal source so that such gate sees only the impedance of the normalizer and not the impedance of the source during the brief time the gate is conducting. Since the impedance of the normalizer is constant, the sampling efficiency remains constant even when testing circuits of different impedance, and the above mentioned gain adjustments are unnecessary when a response normalizer is used with the probe.

When the sampling gate in a direct sampling probe is rendered conducting by the application of interrogating pulses to transmit a sample pulse through such gate, a transient signal is usually generated. This transient signal results from the fact that the output terminal of the sampling gate is held at a D.C. reference voltage in non-feedback type samplers or at D.C. voltage corresponding to the sum of previous sample pulses in feedback type samplers, and this D.C. voltage is different from that of the signal at the time of sampling if a sample pulse is passed through such gate. This transient signal travels forwardly of the transmission line provided by the front end of the probe and when it reaches the tip of the conventional sampling probe it is reflected back whenever the impedance of the circuit being tested is not equal to the characteristic impedance of such transmission line. The reflected transient signal reaches the input terminal of the sampling gate within a very short time so that this reflected transient signal which varies in magnitude with the impedance of the circuit being tested, is superimposed on the sampling pulse transmitted through such gate. The response normalizer of the present invention avoids this variation in magnitude of the reflected transient signal by adding a section of transmission line having a given characteristic impedance to the input end of the sampling probe and a double transient time nominally the same as the gating time of the sampling gate. The normalizer is of sufficient length to delay the further reflection of the transient signal from the forward end of the normalizer back to the sampling gate until after such gate has been rendered nonconducting, thus rendering the system relatively insensitive to the impedance of the circuit being measured. The inner conductor of the response normalizer may be in the form of a resistance wire having a proper amount of resistance distributed along its length so that the tendency of input signals to be reflected and rereflected within the normalizer are damped out to prevent "ringing" type distortion of the input signal. Thus, the primary function of the resistance wire inner conductor is to absorb the energy of the reflected input signal without requiring the delay line of the response normalizer to be terminated in its characteristic impedance. As a result the signal source circuit is not loaded by a delay line termination impedance and only sees the extremely high parallel impedance of the non-conducting sampling gate, and the small effect of the additional parameters of the response normalizer.

The effects of the normalizer with regard to loading of the circuit being measured are minimized by choosing a high characteristic impedance for the normalizer. However, the normalizer should have a low characteristic impedance in order to obtain best sampling efficiency. Therefore, this characteristic impedance of the normalizer actually employed is a compromise between those impedances producing minimum loading and high sampling efficiency.

It is therefore one object of the present invention to provide an improved electrical probe for transmitting portions of a signal.

Another object of the invention is to provide an improved electrical probe containing a signal sampling gate in which a response normalizer is connected to the input terminal of such sampling gate to prevent the distortion of the sample pulses transmitted through such gate which correspond to portions of a high frequency input signal.

A further object of the present invention is to provide an improved direct sampling probe containing a sampling gate in which a response normalizer including a transmission line section is employed to maintain the sampling efficiency of such gate substantially constant when testing signal sources having different impedances.

An additional object of the invention is to provide a response normalizer for a direct sampling probe, which is in the form of a transmission line section having an inner signal conductor of resistance wire to damp the oscillations of input signals reflected from a sampling gate in such probe in order to prevent such reflected input signals from distorting sample pulses transmitted through such gate.

Still another object of the invention is to provide a response normalizer for a direct sampling probe which is of simple and economical construction and which is adapted to fit on the tip end of conventional sampling probes.

Other objects and advantages of the present invention will be apparent from the following detailed description of a preferred embodiment thereof and from the attached drawings of which:

FIG. 1 is a sectional view of a portion of a direct sampling probe, and a response normalizer in accordance with the preferred embodiment of the present invention attached thereto;

FIG. 2 is a sectional view of the response normalizer of FIG. 1 shown detached from the probe with parts broken away for clarity; and FIG. 3 is an enlarged, partial, vertical sectional view taken along line 3—3 of FIG. 2.

As shown in FIG. 1, a direct sampling probe 10, such as that disclosed in copending U.S. patent application of John V. Rogers, Ser. No. 259,064, filed Feb. 18, 1963, and entitled "Direct Sampling Apparatus Employing Differential Amplifier," now U.S. Patent 3,229,212, may include a tubular shield conductor 12 and a signal conductor 14. The probe 10 may be provided with a response normalizer 16 in accordance with the present invention by attaching such normalizer to the front ends of the signal conductor 14 and the shield conductor 12. The sampling probe 10 contains a sampling gate 18 which may be in the form of a four diode bridge including a pair of input diodes 20 and 22 and a pair of output diodes 24 and 26. The cathode and anode of input diodes 20 and 22, respectively, are connected to the input terminal 28 of such gate, while the cathode and anode of output diodes 24 and 26, respectively, are connected to the output terminal 30 of such gate. The input terminal 28 of the sampling gate 18 is connected to the signal conductor 14 which is insulated from the ground shield conductor 12 by a spacer member 31 of insulating material, and the output terminal 30 of such gate is connected to the oscilloscope (not shown) through an output line 32 which may be a small coaxial cable. The anode of input diode 20 is connected to the anode of output diode 24 and to a first interrogating line 34. In addition, the cathode of input diode 22 is connected to the cathode of output diode 26 and to a second interrogating line 36.

Lines 34 and 36 may be small coaxial cables which are connected to a suitable source of D.C. bias voltage so that a small negative D.C. voltage is applied to the anodes of diodes 20 and 24 and a small positive D.C. voltage is applied to the cathodes of diodes 22 and 26 to normally reverse bias such diodes so that the bridge 18 is rendered nonconducting. An interrogating pulse generator (not shown) which produces a pair of narrow interrogating pulses of oppoiste polarity, is connected to lines 34 and 36 so that its applies a positive pulse to the anodes of diodes 20 and 24 and simultaneously a negative pulse to the cathodes of diodes 22 and 26 in order to forward bias such diodes temporarily and to render the sampling gate 18 conducting for a brief period of time determined by the width of such pulses. When this happens, a portion of a high frequency input signal applied to the input terminal 28 of the sampling gate 18 is transmitted as a sample pulse through the sampling gate to the output terminal 30 thereof. The voltage of the sample pulse depends upon the difference in voltage between the input signal and the D.C. reference voltage applied to output terminal 30 from the memory circuit connected to output line 32, as well as on the sampling efficiency of the sampling gate. The sampling efficiency (E) of the sampling gate 18 is approximately equal to the gating time ($T_g$) that the sampling gate is conducting divided by the time constant (RC) of a series circuit including the internal resistance of the signal source and the capacitance connected to the output of the sampling gate, or $$E = \frac{T_g}{RC}$$

Since this series circuit includes the internal resistance of the source, it is obvious that the sampling efficiency of the gate varies when testing signal sources having different impedances when a conventional direct sampling probe is employed. However, when the response normalizer 16 is attached to the front end of a direct sampling probe 10, the delay line formed by such response normalizer prevents the sampling gate from seeing the internal impedance of the signal source due to the fact that such sampling gate is conducting for a time less than twice the transient time of the normalizer. Since the sampling bridge only sees the characteristic impedance of the normalizer as the series charging resistance, the sampling efficiency of the gate is constant.

The response normalizer 16 is shown in greater detail in FIGS. 2 and 3 and includes a hollow outer conductor 38 whose rear end is provided with three depressions 40 for engagement with the front end of the shield conductor 12 on the probe 10 when the rear portion of the normalizer is applied over the forward end of such probe. An inner conductor 42 of resistance wire is supported within the outer conductor 38 of the normalizer so that the inner conductor extends substantially parallel to the cylindrical walls of such outer conductor and is insulatingly spaced therefrom by air, plastic foam or other dielectric material to form a transmission line section having a substantially uniform characteristic impedance of approximately 300 ohms. One end of the inner conductor 42 is attached to a metal socket member 44 by means of a sleeve fastener 46 which is pressed over the tapered frusto-conical end of such socket member to clamp the inner conductor 42 between such sleeve fastener and the tapered end of the socket member 44. After the sleeve fastener 46 has been pressed onto the tapered end of the socket member 44 a small amount of solder 48 may be applied to the front ends of the sleeve fastener and the socket member in contact with the inner conductor 42 to prevent such sleeve member from being removed. The other end of the inner conductor 42 is attached to the tapered rear end of a point member 50 which forms the probe tip of the normalizer. Another sleeve fastener 42 is employed to clamp the inner conductor 42 between the tapered end of the point member 50 and such sleeve fastener is secured to such point member by solder 54 in a similar manner to sleeve fastener 46.

The socket member 44 is rigidly secured within an insulatingly spacer member 56 which may be molded of a suitable plastic material. The spacer 56 may be of hexagonal shape to provide a good friction fit between such spacer and the outer conductor 38 which is provided with a shoulder portion 58 to prevent forward movement of the spacer in order to maintain the inner conductor 42 in a taut condition. After the inner conductor 42 is clamped by the sleeves 46 and 54, it is stretched taut by movement of the point member 50 away from the socket member 44. The point member 50 is insulatingly supported within the outer conductor 38 by means of another spacer member 60 of a suitable plastic material. After the inner conductor has been stretched taut, the outer conductor 38 is staked or crimped to provide an inward projection 62 which engages the spacer 60 to prevent movement of the spacer and point member 50 with respect to the outer conductor. It should be noted that while the inner conductor 42 is not supported precisely coaxially with respect to the outer conductor 38 because of use of fastening sleeves 46 and 52, and whereas this can be accomplished by employing other types of fastening means, the satisfactory operation of the device is not critically dependent upon concentricity of the inner and outer conductors.

The rear end of the socket member 44 is provided with a plurality of resilient fingers 64 which form a socket cavity into which the probe tip end of the signal conductor 14 of the sampling probe extends when the response normalizer 16 is attached to such sampling probe. The response normalizer 16 may be provided with a cover 66 of insulating material over the grounded outer conductor 38, as shown in FIG. 1, to prevent such outer conductor from short circuiting test circuit components when the response normalizer is inserted into a remote position within the apparatus under test.

The response normalizer of the present invention may be formed as an integral part of the sampling probe. However, it is usually desirable to make the response normalizer removable so that the sampling probe may be used alone, or so various plug-on attenuators may be used interchangeably to compensate for signals greater than the probe alone could cope with. An attenuator can be construed so as to incorporate the principle of the normalizer of the present invention. As an alternative embodiment (not shown) the normalizer can be removably connected between the input terminal 28 of the sampling gate and the probe tip 14 so that the normalizer can be removed and the probe tip attached directly to the input terminal of the sampling gate when it is desired to use a conventional sampling.

The total capacitance ($C_T$) which the response normalizer 16 adds to that of the probe is given by the formula $$C_T = \frac{L}{Z_0 V_p} + C_s$$

where L is the length of the normalizer, $Z_0$ is the characteristic impedance of the normalizer and $V_p$ is the velocity of propagation of the signal through the normalizer, and $C_s$ is the stray capacitance of elements 44, 46, 50 and 52, etc. Since the dielectric employed between the inner conductor 14 and the outer conductor 38 is air or predominately air, the velocity of propagation ($V_p$) is substantially equal to the speed of light. In order to obtain a high characteristic impedance ($Z_0$), the diameter of the inner conductor 42 is made quite small, on the order of about .001 inch, to increase the inductance of the normalizer while the spacing between the inner conductor 14 and the outer conductor 38 is made as large as practical to decrease the capacitance between these elements. However, the length (L) of the normalizer is determined by the gating time ($T_g$) which is the period over which the sampling gate 18 is rendered conducting by the interrogating pulses transmitted by lines 34 and 36.

As has been mentioned previously, the response normalizer functions as a delay line to prevent the transient signal, transmitted from the output terminal 30 of the sampling gate 18 through signal conductor 14 to the inner conductor 42 of the normalizer when such sampling gate is rendered conducting, from being reflected from the front end of the normalizer adjacent tip member 50 back through the inner conductor to the input terminal 28 of the sampling gate before such sampling gate is again rendered nonconducting. If $t_d$ is the time delay required for the transient signal to travel the length (L) of the normalizer in one direction, then $2t_d > t_g$ or $$t_d > \frac{t_g}{2}$$

Since $$t_d = \frac{L}{V_p}$$

it follows that $$\frac{L}{V_p} > \frac{t_g}{2}$$

Therefore, the length of the normalizer is determined by the following equation:

$$L > \frac{t_g}{2} V_p$$

Thus, the length of the normalizer must be slightly greater than the product of one-half the gating time multiplied by the velocity of propagation in order to prevent the transient signal produced by the charge on the output terminal 30 of the sampling gate 18 from distorting that portion of the input signal transmitted through the sampling gate as the sample pulse. It should be noted that since the diodes forming the sampling bridge 18 are slightly reverse biased, a portion of the interrogating pulses rendering such sampling gate conducting is employed to overcome the D.C. reverse bias voltage applied to such diodes. Thus, small amounts of the interrogating pulses are capacitively coupled to the input and output terminals of the sampling gate even while such gate remains nonconducting. This will cause some distortion to the sample pulse transmitted through such gate to change the reference voltage stored in the memory circuit of the sampling system. However, this distortion is extremely small compared to that previously produced by the transient signal transmitted from the output terminal 30.

In order to damp the oscillations of the reflected input signal as it is reflected from the end of the normalizer delay line adjacent point 50 and from the input terminal 28 of the sampling gate when such gate is in its nonconducting state, the inner conductor 42 of the normalizer may be made out of a high resistance wire, such as Nichrome, having a high resistance of about 1,000 ohms per foot which is uniformly distributed over the length of the inner conductor. Alternatively, a plurality of fixed resistors may be connected in series with the inner conductor 42 to provide this dampening effect. However, the use of the inner conductor of the delay line as the resistance enables the response normalizer to have a substantially uniform characteristic impedance. In addition, it should be noted that a lumped constant type of artificial delay line can be employed rather than that shown. This lumped constant delay line is formed of a plurality of identical sections of inductors and capacitors which are connected to provide the proper time delay ($t_d$) while enabling the response normalizer to be of a considerably shorter physical length. Other forms of transmission line can be employed, such as a strip line, however, the coaxial type of line is preferred for shielding purposes.

The response normalizer 16 and sampling gate 18 have no appreciable loading effect upon the signal source when the sampling gate is rendered nonconducting because the transmission line provided by the normalizer is short and of relatively high characteristic impedance and is terminated at the probe end by the high impedance of the gate which is of the order of 100 kilohms. Also even though the sampling gate does present a low impedance to the signal source when such gate is rendered conducting, this has no effect upon that portion of the signal seen by the probe which is transmitted through the sampling gate because of the fact that the time delay of the normalizer prevents the momentary change in impedance of the sampling bridge from affecting the signal until after such bridge is again rendered nonconducting.

It will be obvious to those having ordinary skill in the art that various changes may be made in the details of the above-described preferred embodiment of the present invention without departing from the the spirit of the invention. Therefore the scope of the present invention should only be determined by the following claims.

I claim:

1. An apparatus for sampling electrical signals of high frequency, comprising:
   an electrical probe having a hollow shield conductor;
   a signal conductor including a probe tip electrode, supported inside said shield conductor and insulated therefrom with said probe tip extending out the front of said probe;

a sampling means including a sampling gate within said probe and having its input connected to the output of said probe tip electrode and means for applying a gating pulse to said sampling gate for transmitting a portion of the waveform of an input signal applied to said signal conductor, as a sample pulse through said sampling gate; and response normalizer means attached to the front of said probe and including a section of transmission line having its output connected to the input of said sampling gate, said transmission line including an inner signal conductor connected to said probe tip electrode and an outer conductor connected to said shield conductor, for preventing transient signals produced by said change in conductive condition of said sampling means from distorting said sample pulse.

2. A probe apparatus for sampling electrical input signals of high frequency, comprising:

a hollow shield conductor;

a signal conductor supported inside said shield conductor and insulated therefrom;

sampling means including a sampling gate having its input connected to the output of said signal conductor and means for applying a narrow gating pulse to said sampling gate to render said sampling gate briefly conducting for transmitting a portion of the waveform of an input signal applied to said signal conductor, as a sample pulse through said sampling gate, said sampling gate being supported inside said shield conductor and insulated therefrom; and delay means including a section of transmission line having its output connected to the input of said sampling gate, said transmission line including an inner conductor connected to the input of said signal conductor and an outer conductor connected to said shield conductor, for preventing transient signals produced by the change in conduction of said sampling gate means from distorting said sample pulse.

3. A probe apparatus for sampling electrical signals of high frequency, comprising:

a hollow shield conductor;

a signal conductor supported inside said shield conductor and insulated therefrom;

sampling means including a sampling gate having its input connected to the output of said signal conductor and means for applying a narrow gating pulse to said sampling gate to render said sampling gate briefly conducting for transmitting a portion of the waveform of an input signal applied to said signal conductor as a sample pulse from the input to the output of said sampling gate, said sampling gate being supported inside said shield conductor and insulated therefrom; and response normalizer means including a section of transmission line having its output connected to the input of said sampling gate, said transmission line including an inner conductor with its output connected to the input of said signal conductor and an outer conductor connected to said shield conductor, for preventing transient signals transmitted from said sampling gate means when said sampling gate means is rendered conducting from being reflected back to the input of said sampling gate means from the input end of said inner conductor until after said sampling means is again rendered non-conducting to prevent distortion of the sample pulse, and for maintaining the sampling efficiency of said sampling gate means substantially constant when testing signal sources having different impedances.

4. A direct sampling probe for sampling electrical signals of high frequency, comprising:

a hollow shield conductor;

a signal conductor supported inside said shield conductor and insulated therefrom;

sampling means including a sampling gate having its inut connected to the output of said signal conductor and means for applying a gating pulse to said sampling gate to render said sampling gate briefly conducting for transmitting a portion of the wave form of an input signal applied to said signal conductor as a sample pulse from the input to the output of said sampling gate, said sampling means being supported inside said shield conductor and insulated therefrom; and delay means including a section of transmission line having its output connected to the input of said sampling gate, said transmission line including an inner conductor of high resistance wire whose resistance is distributed along the length of said inner conductor with its output connected to the input of said signal conductor and an outer conductor connected to said shield conductor, said transmission line having a length greater than the product of the velocity of propagation of said line multiplied by one half the time said sampling gate means is rendered conducting, for preventing transient signals produced by said sampling gate means and reflected at the ends of said line from distorting the sample pulse and for attenuating said transient signals.

5. A response normalizer for an electrical probe containing a signal sampling gate, comprising:

a tubular outer conductor;

an inner conductor of resistance wire of solid metal cross section positioned within said outer conductor and having a high value of resistance distributed along its lengths;

spacer means for supporting said inner conductor so that it is insulatingly spaced from said outer conductor and forms a transmission line section with said outer conductor;

a probe tip member including a tapered rear portion supported within said outer conductor and having a front end portion extending out of said outer conductor;

a first sleeve member pressed over said tapered rear portion of said probe tip member to clamp one end of said inner conductor between said first sleeve member and said probe tip member;

a socket member having a rear portion for attaching said response normalizer to the input end of the sampling probe, and a tapered front portion; and a second sleeve member pressed over said tapered front portion of said socket member to clamp the other end of said inner conductor between said second sleeve member and said socket member.

References Cited by the Examiner

UNITED STATES PATENTS 2,673,233   3/1954   Salisbury _____ 174—88
2,755,331   7/1956   Melcher _____ 174—88 X
3,100,289   8/1963   Lorch _____ 174—88 X

OTHER REFERENCES

Radio and Television News (Liebscher), vol. 50, No. 2, August 1953, pages 40, 41, 42, 132.

WALTER L. CARLSON, *Primary Examiner.*

E. L. STOLARUN, *Assistant Examiner.*